Aug. 22, 1950     E. F. VOBEDA     2,520,022

MICROMETER DEPTH AND PROJECTION GAUGE

Filed Sept. 24, 1947

INVENTOR
EDWIN F. VOBEDA

BY

ATTORNEYS

Patented Aug. 22, 1950

2,520,022

UNITED STATES PATENT OFFICE 2,520,022

MICROMETER DEPTH AND PROJECTION GAUGE

Edwin F. Vobeda, Racine, Wis.

Application September 24, 1947, Serial No. 775,797

1 Claim. (Cl. 33—169)

My invention refers to micrometers of the depth gauge type, and it has for its primary object to provide means for selectively converting such instrument from a socket or depth gauge measurement device to a gauge for measuring projections by interchangeable parts without rearrangement or change in the general design of gauge such as disclosed in Patent No. 1,370,310 or 1,568,295, the said gauges being of "Starrett" type.

The specific object of my invention is to provide a short measuring rod encased within the barrel and having a separate scaled reading upon said barrel, whereby depth of a machine element is determined or a projection upon the same is measured.

A further object of my invention is to provide interchangeable apertured blocks for the winged shoe associated with measuring rods, whereby various lengths or depth of projections are determined, it being understood that I provide two scales upon the micrometer barrel for reading the depth of chambers or sockets, and for reading projections, which projections are inserted into the bore of the barrel for measurement.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1:
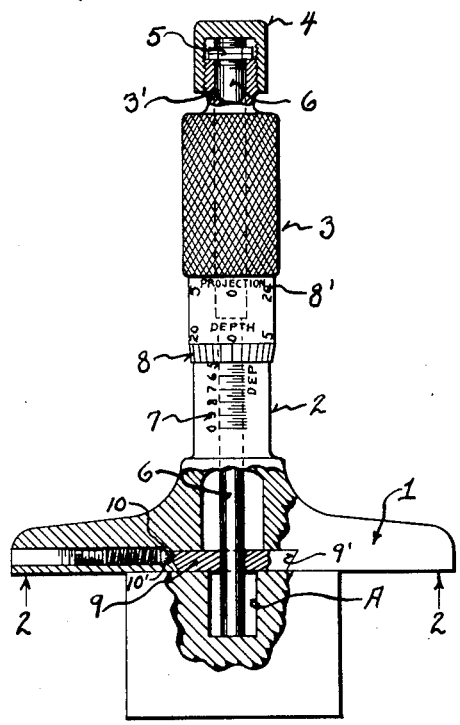
Figure 1 represents a side elevation of a micrometer embodying the features of my invention when assembled for measuring sockets or depth channels, partly in section, as indicated by line 1—1 of Figure 2.

Referring by characters to the drawings, 1 indicates a winged shoe having extending upwardly therefrom a barrel 2 mounted upon which is a rotary sleeve 3. The upper shank end 3' of the sleeve carries a thimble 4 for encasing the capped end 5 of a measuring rod 6, which rod, as shown in Figure 1 of the drawings, projects below the base of the shoe 1, it being understood that rods of different length may be supplied, and the same are for the purpose of measuring the depth of cavities A of any machine element.

The scale 7 for measuring depths of machine elements is indicated upon one face of the barrel, and the same is read by an indicating depth scale 8 aligned upon the bottom of the sleeve 3.

All of the referred to structure is of standard type and forms no part of my invention.

In order to convert the above referred to depth gauge micrometer into a combination depth gauge and projection instrument, I provide an interchangeable apertured base block 9 which is in dovetailed connection with a transversely disposed channel 9' of the base of the shoe 1. This block is apertured for guiding the lower end of the rod 6. The block 9 is slipped into position flush with the bottom wall of the shoe, and said block is held in its locked position in alignment with the bore of the barrel by a spring controlled plunger 10, which plunger engages a notch 10' in one of the tapered side walls of said block. Thus, when the block is slid into position it is locked by the spring plunger against lateral movement.

As shown in Figure 1, the micrometer is seated upon the machine element having a cavity or socket A therein, which socket is engaged at its bottom by the rod 6, whereby its depth is determined by the normal reading of the scale members 7 and 8.

To convert the above described depth gauge, all that is necessary is to remove the block 9 from its dovetailed channel and insert a base block 11, which block is provided with a central opening therein 11', that is approximately the diameter of the inner bore of the barrel 2.

Figure 3:
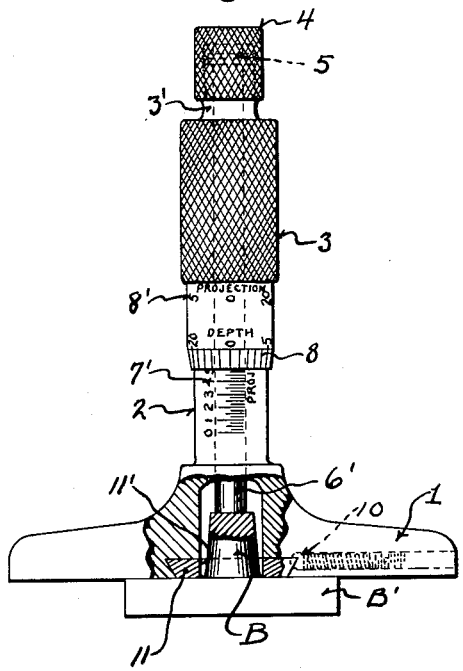
Figure 3 is a partly sectional elevation view of the micrometer equipped for measuring the height of projections.
Figure 2:
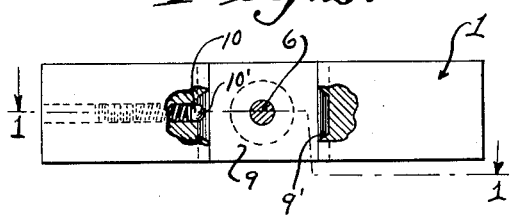
Figure 2 is a bottom plan sectional view of the same, the section being indicated by line 2—2 of Figure 1.
Figure 4:
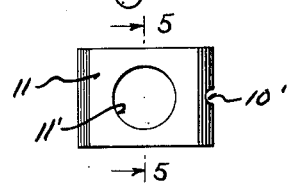
Figure 4 is a detailed plan view of an apertured base block.

As indicated in Figure 3 of the drawings, the long depth gauge rod 6 is removed and a second short projection gauge rod 6' is substituted therefor. The projection gauge rod 6' is of such length that when it is moved downwardly within the bore of the barrel its bottom end will be in exact alignment with the shoe base. In order to obtain a proper reading of the length of a projection the barrel 2 of the micrometer is provided with a second scale 7' and a companion reading scale 8' positioned slightly above the bottom of the sleeve.

The micrometer so equipped is then inserted over a machine element projection B mounted upon a base B', and said projection extends into the bore of the barrel, while the bottom face of the shoe and its associated block will rest squarely upon the base B' of said machine element. After the micrometer is positioned over the projection B of the machine element the rod 6' is moved downwardly by rotation of the sleeve, and when the bottom of the rod engages the end of the projection B, the length of said projection may be readily shown by rotating the sleeve in conjunction with the scale indicator gauges 7', 8', whereby the height may be readily determined. Thus, a standard micrometer, which under present conditions can only measure the depth in a socket, with my improved additional elements, the same is capable of measuring both the depth of a socket in a machine element and a projection in another machine element.

Figure 6:
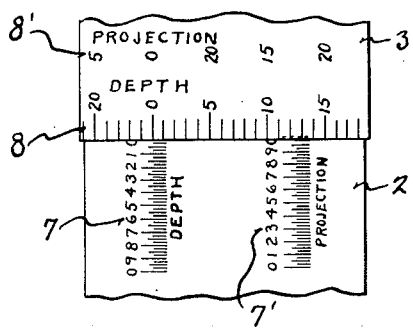
Figure 6 is a diagrammatic view of a flattened out barrel and associated sleeve illustrating the two scales upon the face of the barrel for selectively reading measurements of depth sockets or measurements of projections.
Figure 5:
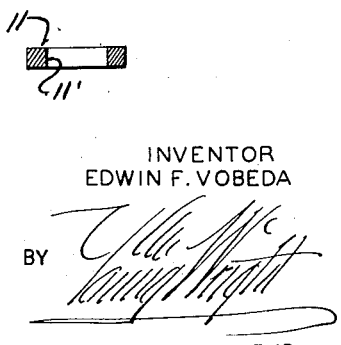
Figure 5 is a cross section of the same.

As shown in Figure 6, the separate scales in conjunction with the barrel and sleeve element may readily be read for determining either a projection or a depth measurement in any type of machine element.

I claim:

In a combination depth and projection micrometer gauge, a shoe having a plane work engaging face, said shoe being provided with an enlarged projection receiving cavity opening out through the work engaging face, a barrel on the shoe communicating with the cavity, a rotatable sleeve on the barrel, cooperating scale designations on the barrel and sleeve, a measuring spindle rod in the barrel extending into the cavity, means including the sleeve for adjusting the spindle rod longitudinally of the barrel, and a removable guide plate associated with the shoe for partially closing the cavity having an outer face in the same plane as the shoe work engaging face and provided with a guide opening for the spindle rod, when the spindle rod is projected beyond the work engaging face.

EDWIN F. VOBEDA.

REFERENCES CITED

The following references are of record in the file of this patent:

UNITED STATES PATENTS

| Number | Name | Date |
|---|---|---|
| 515,234 | Lavigne | Feb. 20, 1894 |
| 519,541 | McBride | May 8, 1894 |
| 1,155,440 | Rebelski | Oct. 5, 1915 |
| 1,254,607 | Koch | Jan. 22, 1918 |
| 1,568,295 | Schleicher | Jan. 5, 1926 |
| 1,737,764 | Jacobs | Dec. 3, 1929 |
| 1,952,965 | Beard | Mar. 27, 1934 |
| 2,192,069 | Cox | Feb. 27, 1940 |